United States Patent [19]

Jan et al.

[11] Patent Number: 4,969,520

[45] Date of Patent: Nov. 13, 1990

[54] STEAM INJECTION PROCESS FOR RECOVERING HEAVY OIL

[75] Inventors: Raymond J. Jan, Englewood; Thomas G. Reed, Jr., Golden, both of Colo.

[73] Assignee: Mobil Oil Corporation, Fairfax, Va.

[21] Appl. No.: 371,489

[22] Filed: Jun. 26, 1989

[51] Int. Cl.$^5$ .................... E21B 43/24; C02F 1/52
[52] U.S. Cl. .................... 166/266; 166/272; 210/665; 210/677; 210/687; 210/712; 210/737; 210/747
[58] Field of Search .................. 166/266, 272, 300; 210/664, 665, 663, 677, 670, 687, 712, 737, 747

[56] References Cited

U.S. PATENT DOCUMENTS

| | | | |
|---|---|---|---|
| 2,807,582 | 9/1957 | Applebaum | 210/664 |
| 3,193,009 | 7/1965 | Wallace et al. | 166/272 |
| 3,423,311 | 1/1969 | Hetherington et al. | 210/664 |
| 3,458,438 | 7/1969 | Smith et al. | 210/664 |
| 3,493,498 | 2/1970 | Abrams et al. | 210/687 |
| 3,881,550 | 5/1975 | Barry | 166/266 |
| 3,918,521 | 11/1975 | Snavely et al. | 166/272 |
| 4,098,691 | 7/1978 | Filby | 210/668 |
| 4,235,715 | 11/1980 | Wiegart | 210/670 |
| 4,448,693 | 5/1984 | Kiehling et al. | 210/673 |
| 4,463,809 | 8/1984 | Tao | 210/687 |
| 4,518,505 | 5/1985 | Lim et al. | 210/737 |
| 4,877,536 | 10/1989 | Bertness et al. | 166/272 |

OTHER PUBLICATIONS

"Brochure", EIMCO Reactor–Clarifier, Eimco Equipment Co., Salt Lake City, Utah.
"Economics of Produced Brine Softening", Report, G. E. Gardner & S. G. Miller, U.S. Dept. of Energy, pp. 1–57.

Primary Examiner—Peter Hruskoci
Attorney, Agent, or Firm—Alexander J. McKillop; Charles J. Speciale; Geroge W. Hager, Jr.

[57] ABSTRACT

A steam flood recovery process for recovering heavy oil from a producing formation wherein the production stream is processed to separate the produced water from the heavy oil and then the hardness of the water is first reduced to from 10–60 ppm by treatment with caustic and then reduced to less than 1 ppm by flowing it through a weak acid cation resin whereby the water can be used to generate the steam used in the recovery operation.

5 Claims, 2 Drawing Sheets

STEAM INJECTION PROCESS FOR RECOVERING HEAVY OIL

DESCRIPTION

1. Technical Field

The present invention relates to a process for recovering heavy oil by injecting steam into a production formation and in one of its preferred aspects relates to a heavy oil recovery process wherein produced water is softened by caustic treatment for use in generating steam for the recovery process.

2. Background Art

In the production of heavy oil it is common to use steam to heat the oil in place to reduce its viscosity so that it will more readily flow into the producing formation. If possible, it is highly desirable to use the water which is produced with the heavy oil as feed water for the steam generators in such recovery operations. Unfortunately, however, the "hardness" of such produced waters is such that use of this water without treatment normally will cause substantial damage, e.g., scaling, to the steam generators and associated equipment thereby resulting in considerable increases both in costs and in the downtime required for cleaning, repair, and/or replacement of the equipment. As will be understood in the art, "hardness", as used herein, refers to the combined concentrations of calcium and magnesium salts found in the water and is expressed as parts per million (ppm). Accordingly, for a produced water or other similarly hard water to be used as a feed water for steam generation, it must be "softened" to reduce its hardness, preferably to as near zero, as possible, e.g., less than 1 ppm. Also, while silica is not technically considered in figuring the hardness value of a water, it, too, presents scaling problems if a substantial amount is present in the feed water.

There are several well known processes for softening water for steam generation and the like. For example, one type of water softening process utilizes ion-exchange resins to remove the calcium and magnesium ions from the water. These resins may be "weak acid cation resins", "strong acid cation resins", or various combinations thereof. As will be understood in the art, "strong acid cation resins" normally refers to resins having a sulfonic acid functional group (e.g., sulfonated styrene divinylbenzene) and several are commercially available (e.g., "HCR-S" resin from Dow Chemical USA; "Amberlite IRC-20" from Rohm and Haas Co.). While "weak acid cation resins" refer to cation exchange resins having a carboxylic acid functional group (e.g., acrylic/divinylbenzene) and several are commercially available (e.g., "Ionac CC" from Sybron Corp., Birmingham, N.J.) see also U.S. Pat. No. 3,995,009 for a more detailed description of such resins.

The water softening process disclosed in U.S. Pat. No. 4,235,715 uses exchange resins wherein the feed water is first passed through a weak acid resin to remove the hardness ions which are associated with alkalinity and then through either another weak acid resin or a strong acid resin to remove substantially the remaining hardness ions. For other water softening processes which use ion exchange resins, see U.S. Pat. Nos. 4,098,691 and 4,448,693.

While ion-exchange resin processes work well to remove the calcium and magnesium values from water, neither weak acid resins nor strong acid resins have any noticeable effect on removing scale-causing silica from the water. Further, when strong acid resins are regenerated, the calcium and magnesium ions from the resins are entrained in the regenerative liquid, e.g., brine, which, in turn, is routinely disposed of by injection into a subterranean formation. Unfortunately, the calcium and magnesium values in the spent regenerative liquid can plug the formation thereby severely restricting the injection of the waste liquid into the formation.

Still further, in strong acid resin systems, as much as 10-15% of the feed water may be lost due to regenerant make-up, backwashing, and rinsing of the resin. In the oil field, if the feed water contains residual oil, the oil may poison the resins to the extent where the resins can not be regenerated and will have to be replaced at considerable cost.

Other well known water softening processes use lime (calcium hydroxide) to remove all or at least a substantial amount of the calcium, magnesium, and a large part of the silica from a feed water. Since in most instances all of the calcium and magnesium are not removed by the lime treatment, the treated water is then flowed through with an ion exchange, strong or weak acid resins to "polish" the water (i.e., remove substantially all of the remaining calcium and magnesium ions). Again, while this process adequately softens a feed water for steam generation, there are certain aspects involved which make water softening with lime unattractive for particular applications such as where the produced water is used for generating steam in heavy oil recovery operation. That is, when the produced water is treated with lime, very large amounts of solids are precipitated which present considerable disposal problems. Also, the precipitates formed in a lime water softening quickly harden if the softening operations are halted for any substantial time and the resulting concrete-like mass sets up and is extremely difficult to remove from the system when operations are resumed.

Further, in most processes using lime, the feed water is routinely heated to above its boiling point (212°-220° F.) to enhance the chemical reactions between the lime and the hardness ions. These high temperature "hot lime" processes require expensive pressure vessels, additional energy for heating, and present delicate handling and safety problems, all of which add substantially to the overall costs of the water softening operation.

Still other known water softening processes use direct heat exchange to reduce hardness (see U.S. Pat. No. 4,518,505) while others use ion exchange resins to remove substantially all of the hardness ions and then add caustic to raise the pH of the treated water to prevent corrosion (e.g., potable water treatment by some municipalities).

DISCLOSURE OF INVENTION

The present invention provides an integrated steam flood, heavy oil recovery process wherein at least part of the water produced with the heavy oil is softened by an improved water softening process whereby the softened water can be safely used as feed water for generating the steam used in the recovery process.

More specifically, in the present invention, water is separated from the production stream of a steam flood, heavy oil recovery operation. The hardness of the produced water is reduced by mixing it with caustic (i.e., sodium hydroxide). The caustic reacts with the calcium and magnesium salts in the water to form insoluble precipitates (i.e., calcium carbonate and magnesium hydroxide) and further causes reactions with the silica in the water to precipitate, possibly, as magnesium silicate.

Caustic is added to the water in an amount sufficient to raise the pH of the water to within the range of 9.0 to 10.5 and to reduce its hardness to within the range of about 10 to about 60 ppm. To reduce the hardness to a lower value with caustic would require substantially greater amounts of caustic and would be uneconomical in most practical applications. To reduce the amount of caustic required to reduce the hardness to 10–60 ppm and to speed up the reactions involved. It is desirable to maintain the temperature above about 140° F. but below the boiling point of the water so no pressure vessel will be required for the softening process. Since the temperature of water produced by a steam flood recovery operation is already within the desired range (e.g., 180° F.), no heat will ordinarily have to be added in the present invention.

The caustic is mixed with the produced water within a vessel which provides adequate agitation and one which allows the precipitates to settle to the bottom where they are removed as a slurry (i.e., "sludge"). The sludge is then separated with the liquids being returned to the mixer and the solids (the only "waste" in the process) being disposed of as landfill material or put to other use.

The treated water from the mixer is flowed through a filter to remove entrained solids before it is flowed through a weak acid cation exchange resin to remove substantially all of the remaining calcium and magnesium salts thereby reducing the hardness of the water to less than 1 ppm. This softened water is now safe for generating steam for use in the steam flood recovery operation. The water used to backflush the filter and the chemicals used to regenerate the ion exchange resin are all flowed to the mixer vessel thereby further reducing any waste disposal problems.

The present invention provides many advantages over known prior water softening processes. For example, the present process does not experience a 10–15% product water loss as is the case with strong acid resin systems. Further, the removed calcium and magnesium values are removed as solid waste in the present invention while they remain in the regenerative liquids in a strong acid resin system which may cause severe plugging of the formation during disposal. The caustic used in present invention removes substantial amounts of silica from the water similarly as does previously used lime but produces only approximately 20% of the amount of precipitated solids (waste) as does a lime softening process. Still further, the present process produces a sludge that is a lot less susceptible to scaling and plugging as compared to the lime softening sludge.

BRIEF DESCRIPTION OF THE DRAWINGS

The actual operation and the apparent advantages of the present invention will be better understood by referring to the drawings in which like numerals identify like parts and in which.

BEST MODE FOR CARRYING OUT THE INVENTION

Figure 1:
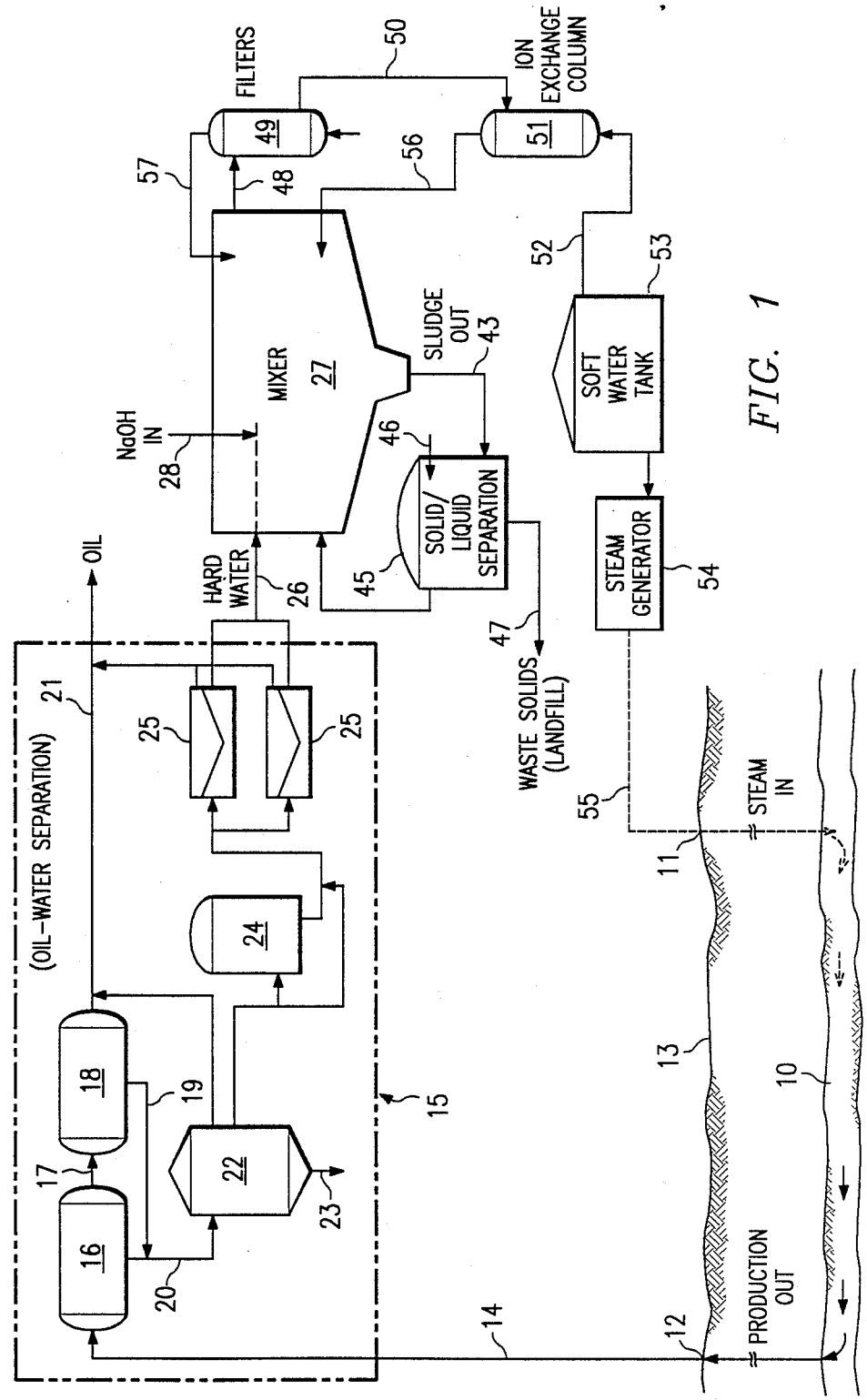
FIG. 1 is a schematic flow diagram of a steam flood recovery process in accordance with the present invention.

Referring more particularly to the drawings, FIG. 1 represents a flow diagram of a steam flood recovery process in accordance with the present invention. As will be understood in the art, a steam flood recovery process is one wherein steam is generated at the surface and is injected through a wellbore into a formation to heat the oil therein thereby reducing its viscosity so it will flow more readily from the formation. A line drive-type steam flood is illustrated wherein steam is injected into a subterranean production formation 10 through an injection well 11 to heat and drive oil toward production well 12 through which the fluids are produced to the surface 13. While separate injection and production wells are illustrated, it should be recognized that in some steam flood operations, a single well is used for both injection and production, i.e., "huff-puff or cyclic steam" operations.

The production from well 12 containing a mixture of oil and water (e.g., 75% water, 25% oil) is flowed via line 14 to oil-water separator means 15 where substantially all of the oil is separated from the produced water. While separator means 15 can be comprised of any known means, preferably it is comprised of one or more "free-water knock-outs" (FWKO) 16 which allow separation of the oil and water by gravity. The separated oil then passes through line 17 to heater treater 18 where substantially all of any remaining water is removed and returned through line 19 to the water outlet 20 of FWKO 16. The oil flows from treater 18 through line 21 to storage, pipeline, or the like. The produced water normally has a high TDS, e.g., 11,000 ppm, and a high hardness, e.g., 500 ppm, and accordingly would quickly foul most steam generating equipment if used untreated as a steam generator feed water.

The produced water, after most of the oil has been separated therefrom, is fed through line 20 to cone-bottom tank 22 where entrained solids, e.g., sand, settle to the bottom to be removed through outlet 23 and most of any oil remaining in the water rises to the top to be removed. If any substantial oil still remains in the water, the produced water is flowed through flat-bottom tank 24 and one or more induced-gas flotation units 25 to remove substantially all of the oil from the produced waters.

After substantially all of the oil has been removed, the produced water flows through line 26 and into mixer 27 where it is thoroughly mixed with caustic (i.e., sodium hydroxide) which is preferably supplied to mixer 27 as an aqueous solution through inlet 28. The caustic (NaOH) reacts with the hardness ions, i.e., calcium (Ca) and magnesium (Mg) to form insoluble precipitates, i.e., calcium carbonate and magnesium hydroxide, respectively as follows:

(1) $Ca(HCO_3)_2 + NaOH \rightarrow CaCO_3 \downarrow + NaCHO_3 + H_2O$ (2) $Mg(HCO_3)_2 + 2NaOH \rightarrow Mg(OH)_2 \downarrow + 2NaHCO_3$ Also, the magnesium hydroxide, $Mg(OH)_2$, which is formed in reaction (2) above, interacts with silica in the produced water to precipitate a substantial amount of silica as insoluble magnesium silicate.

While the produced water and caustic can be mixed in any appropriate type of vessel, mixer 27 is preferably comprised of a type of mixing unit which is used by municipalities and industries to treat and clarify waters and/or wastewaters. Such a unit is shown in FIG. 2 and such units are available commercially, e.g., "Reactor-Clarifier" Type HRB, Eimco Process Equipment Co., Salt Lake City, Utah.

Figure 2:
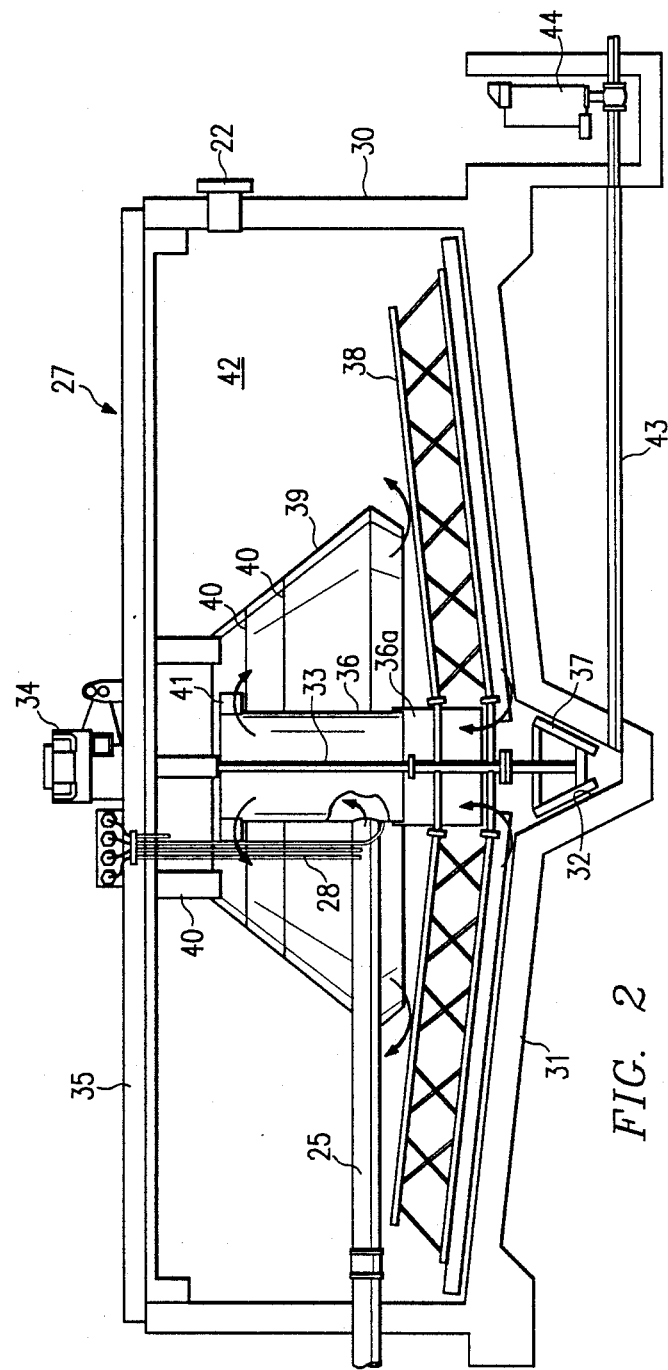
FIG. 2 is a sectional view of a preferred mixer vessel used in the process of FIG. 1.

As seen in FIG. 2, mixer 27 is comprised of a vessel 30 having bottom 31 sloping downward and inward toward central slurry sump 31 which, in turn, has an outlet 43. Shaft 33, having turbine 41 at its upper end and sump scrapper 37 on its lower end is centrally mounted in vessel 30. Shaft 33, is rotated by motor 34 which is mounted on truss 35 which, in turn, spans across the top of vessel 30. Recirculating drum 36 is concentrically fixed around shaft 33 and has an opening through which water inlet 25 passes. A rotating drum 36a is fixed to shaft 33 and carries rake arms 38 which sweep the bottom 31 when shaft 33 is rotated. A cone-shaped partition 39, having baffles 40 therein, is concentrically suspended within vessel 30 to form a reaction well.

In operation, the produced water enters vessel 30 through inlet 25. Caustic, in aqueous solution is flowed through lines 28 and into the conduit forming inlet 25 to mix with the produced water. The water and caustic flows into recirculating drum 36 where it immediately contacts a large volume of dense slurry of previously precipitated solids as they are pumped upward in drum 36 by turbine 41. Several times the inlet rate of the water is recirculated in drum 36 to mix with the incoming produced water. The mixed water and caustic passes under partition 39 into the clarification zone 42 of vessel 30. The heavier particles of the precipitates settle onto floor 31 where they are raked by arms 38 into center for recirculation or removal from sump 32 through outlet 43 by sludge pump 44.

Referring to FIG. 1 again, the precipitates are removed from mixer 27 as a slurry or "sludge" which is flowed to a solid/liquid separation devise such as centrifuge, 45 where a flocculant, e.g., Percol 727 by Allied Chemicals, may be added through line 46 to aid in separating the solids in the slurry from the liquids therein. These solids, which constitute the only substantial waste in the present softening operation, are removed through line 47 and are ready for disposal, e.g., as landfill material, etc. The liquids from separator 45 are flowed back into mixer 27.

As will be explained in more detail in the following example, the hardness of the treated water is directly related to the final pH of the water when it leaves mixer 27. Accordingly, the amount of caustic to be added in a particular softening operation will depend on the initial and final hardnesses of the water to be treated, the temperature of the water, etc. Once these factors are known, the amount of caustic required can be easily calculated using known relationships. Normally more than the stoichiometric value will need to be added since some of the caustic may react with dissolved salts or organics other than those forming the insoluble calcium and magnesium salts. Accordingly, the amount of caustic needed to achieve a desired hardness reduction in a particular water is preferably determined experimentally. For example, the following table set forth experimental results for a water having an initial hardness of 500 ppm and TDS of 11,000 ppm a temperature of 80° C. (176° F.); and an initial pH of 6.8:

TABLE

| pH | 9.0 | 9.5 | 10.0 | 10.5 | 11.0 |
| --- | --- | --- | --- | --- | --- |
| $\frac{\text{LB NaOH}}{\text{Bbl} \cdot \text{H}_2\text{O}}$ | 0.2100 | 0.3360 | 0.4564 | 0.5992 | 0.8792 |
| Hardness (ppm) | 160 | 60 | 10 | <5 | <1 |

The rate of reaction between the caustic and the hardness ions in the water can be increased by increasing the temperature of the reactive mixture. Accordingly, the produced water can be heated by an external source (not shown) before it is fed to mixer 27 but is always maintained below the boiling point of water (i.e., 212° F., preferably at about 180° F.) to eliminate any need for specialized, pressure vessels such as those required in prior art "hot lime" processes. In the present invention, the water being treated is produced as part of the production of a steam recovery operation and will already be at a desired elevated temperature (e.g., 140°-210° F.) so no additional heating will ordinarily be needed.

It will be noted from the above table that the amount of caustic needed to reduce the hardness of the water from 60 ppm to the desired value for steam generation of less than 1 ppm is approximately 3 times that required to reduce the hardness from 500 ppm to 60 ppm and that approximately half of all of the total caustic used is needed to remove only the last 10 ppm of hardness. Accordingly, while caustic could be used to remove substantially all of the hardness from a water, it is preferred in the present invention to use caustic only to reduce the hardness to a value between 10-60 ppm and then remove the relatively small remainder by passing the treated water through an ion-exchange resin. This substantially reduces the costs and the handling problems of the water softening process.

Referring again to FIG. 1, the treated water from mixer 27, now with its hardness reduced to about 10-60 ppm, is flowed through line 48 to filter(s) 49 (e.g., sand-packed columns) where any entrained solids are removed from the water. The water continues through filter(s) 49 and line 50 to ion-exchange column 51. Preferably, the ion exchange resin used in column 51 is a weak acid cation exchange resin, this being a cationic resin having a carboxylic acid functional group such as acrylic/divinylbenzene (e.g., "Ionac CC" resin from Sybron Corp., Birmingham, N.J., "Amberlite IRC-476", Rohm and Haas Co., Philadelphia, PA; "Lewatit CNP80", Bayer AG, Germany.

As will be understood, substantially all of the remaining hardness ions, i.e., calcium and magnesium, are removed from the produced water by ion exchange with the resin as the water passes through column 51. The softened water, now having a final hardness of less than 1 ppm, flows through outlet 52 of column 51 to a soft water storage tank 53. The water from tank 53 is supplied as feed water to steam generator(s) 54 which, in turn, generates steam which is supplied to injection 11 though line 55. The steam is injected into formation 10 to carry out the steam flood recovery operation.

When the resin in column 51 becomes "loaded", it is regenerated by flowing regenerative liquids therethrough. For example, for a weak acid cation exchange resin, a 5% hydrochloric acid solution is first flowed through the resin to remove the exchanged calcium and magnesium ions from the resin and then the regeneration of the resin is completed by flowing a 5% sodium hydroxide solution therethrough. In the present invention, both the spent hydrochloric acid solution and the spent sodium hydroxide regenerative solutions (including the calcium and magnesium) are flowed from column 51 to mixer 27 through line 56. Also, the liquid, e.g., water, used to flush the filter(s) 49 is flowed to mixer 27 through line 57 whereby substantially all of the "waste" liquids generated by the present process are all "disposed of" in mixer 27 where they are mixed and handled with the produced water leaving the solids from separator 45 as substantially the only "waste" in the process.

What is claimed:

1. A steam flood process for recovering heavy oil and water from the production stream of a producing formation, said process comprising:

processing the production stream from the producing formation to separate water containing calcium magnesium compounds from said heavy oil;

flowing said water into a mixing vessel;

mixing sufficient sodium hydroxide with said water within said vessel to adjust the pH of the water to a value of from about 9.0 to about 10.5 while maintaining the temperature of the water in the range from about 140° to about 210° F. to thereby react with said calcium and magnesium compounds to form and precipitate insoluble calcium carbonate and magnesium hydroxide from said water to reduce the hardness of the water to a value of from about 10 to about 60 ppm;

recirculating at least part of said insoluble calcium carbonate and magnesium hydroxide during said mixing;

removing at least part of said insoluble calcium carbonate and magnesium hydroxide through one outlet of said vessel removing said water through a different outlet of said vessel after its hardness has been reduced to from about 10 to about 60 ppm and flowing said water through a cation exchange resin to remove substantially all of the remaining calcium and magnesium from said water;

generating steam from said water; and injecting said stream into said producing formation to heat said heavy oil therein.

2. The process of claim 1 wherein said sodium hydroxide is supplied to said mixing vessel as an aqueous solution.

3. The process of claim 1 wherein said cation exchange resin comprises a weak acid cation exchange resin having a carboxylic acid functional group.

4. The process of claim 3 including:

flowing regenerative liquids through said weak acid cation exchange resin to regenerate same; and passing said regenerative liquids to said mixing vessel after they have flowed through said resin.

5. The process of claim 4 wherein said insoluble calcium carbonate and magnesium hydroxide are removed from said mixing vessel as a sludge and said process includes:

separating said calcium carbonate and magnesium hydroxide from any liquids in said sludge; and returning said any liquids to said mixing vessel.

* * * * *